March 5, 1963 W. A. MILLER ETAL 3,079,643
MANUFACTURE OF DEPOSITED LATEX ARTICLES
Original Filed April 22, 1953 4 Sheets-Sheet 1

INVENTORS
Wilbur A. Miller &
Edwin B. Gienger, Jr.

BY Lewis H. Lanman
ATTORNEY

March 5, 1963 W. A. MILLER ETAL 3,079,643
MANUFACTURE OF DEPOSITED LATEX ARTICLES
Original Filed April 22, 1953 4 Sheets-Sheet 2

INVENTORS
Wilbur A. Miller &
Edwin B. Gienger, Jr.

BY Lewis H. Lanman
ATTORNEY

March 5, 1963 W. A. MILLER ETAL 3,079,643
MANUFACTURE OF DEPOSITED LATEX ARTICLES
Original Filed April 22, 1953 4 Sheets-Sheet 4

INVENTORS
Wilbur A. Miller &
Edwin B. Gienger, Jr.

BY Lewis H. Lauman
ATTORNEY

United States Patent Office 3,079,643
Patented Mar. 5, 1963

3,079,643
MANUFACTURE OF DEPOSITED
LATEX ARTICLES
Wilbur A. Miller and Edwin B. Gienger, Jr., Dover, Del., assignors to International Latex Corporation, Dover, Del., a corporation of Delaware
Original application Apr. 22, 1953, Ser. No. 350,342, now Patent No. 2,867,847, dated Jan. 13, 1959. Divided and this application Jan. 8, 1959, Ser. No. 789,763
2 Claims. (Cl. 18—58.7)

This invention relates to improvements in the art of making seamless rubber articles, such articles being typically adapted for use as sheaths or envelopes for restraining, protecting or shaping a portion of the human body. A major use of such sheaths has been as rubber girdles, panties and similar undergarments which are economically made from aqueous dispersions of natural rubber or other elastomers, such dispersions being commonly referred to as rubber latex. Because of the public's familiarity with rubber latex girdles, the present invention will be described as applied thereto. However, those skilled in the art will understand how the invention can be employed in the manufacture of other rubber articles. This application is a divisional application of our co-pending application Serial No. 350,342, filed April 22, 1953, now Patent No. 2,867,847.

Rubber latex girdles, as originally disclosed in U.S. Patent 2,360,736, issued October 17, 1944 to A. N. Spanel, have been satisfactory products, as proven by customer acceptance, and have been made additionally attractive to the consuming public by many worthwhile improvements. However, attempts to increase the porosity of such girdles have not been heretofore successful even though those skilled in the art have known how to prepare perforate rubber sheeting of various types; apparently no feasible method has been found to incorporate such sheeting in an eveloping sheath without producing either a weak article or one which has seams that are uncomfortable. The measure of the success in solving this problem can be judged by the fact that no dipped latex girdles having extensive porosity have ever been marketed, in spite of the very obvious sales appeal of such an article.

The present invention overcomes the obstacles apparently found unsurmountable by previous workers in the field and, in general, provides a seamless, peripherally complete sheath, especially one which is worn in a stretched condition such as a girdle or similar undergarment, of deposited latex film in which a sufficient portion of the body of the girdle is pervious or porous as to provide for adequate escape of perspiration, even in hot weather. Such porosity is effected by the generation of a multitude of closely spaced, straight pores communicating with both surfaces of the deposited latex film and formed during the manufacture of the article, as described more fully hereinafter. Such pores advantageously have sides and shoulders shaped by the surface tension exerted on small openings made in a continuous appropriately contoured film of latex while in a plastic, flowable or moldable condition, and consequently have more resistance to tear than punched or sheared perforations.

In general, such sheaths are generated by dipping in a bath of rubber latex a rigid dipping form of appropriate contour comprising a rigid backing, a peripherally complete article generating surface in which there are pores bridgeable by rubber latex, and means to force gas through said pores; removing the dipping form from said bath under conditions, including rate of removal, such that the form is covered by a continuous film of liquid latex (i.e., with substantially all of said pores bridged by films of latex); and creating a multitude of pores in the film of latex by forcing gas out of substantially all of the pores of the dipping form and thereby breaking or bursting the minute portions of the latex film bridged over each pore of the dipping form. The deposited latex film, which now contains a multitude of channels or pores communicating with both surfaces of the film, is thereafter processed, as by a procedure which includes repeating the above operation for building up film thickness, stripping the film from the dipping form and trimming, so that the finished product is a marketable article, all as described more specifically hereinafter.

In order that the invention may be more clearly understood, reference is now made to the accompanying drawings in which several embodiments of the invention are illustrated, it being understood that these embodiments are shown by way of illustration to indicate that the invention may be embodied in many different forms.

Figure 1:
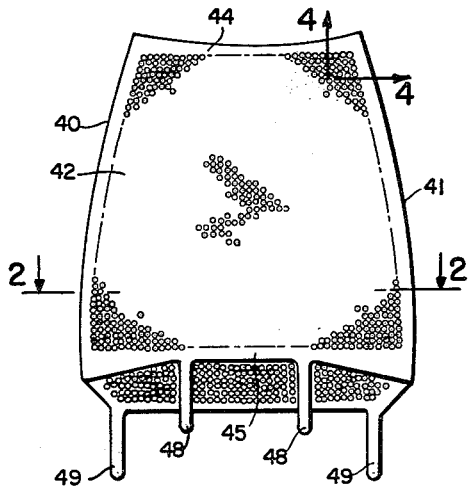
FIGURE 1 is a plan view of the front of a girdle illustrating a preferred embodiment of the invention, the girdle not being in use but in a relaxed position, as on a table.
Figure 2:
FIGURE 2 is a cross sectional view of the girdle of FIG. 1 along the line 2—2, on an enlarged scale.

Shown in FIG. 1 is a supporting girdle or form fitting undergarment or sheath formed by the process of this invention having oppositely disposed curved side areas 40 and 41, which are of limited width and extend over substantially the full longitudinal extent or depth of the girdle, and plane front and back areas 42 and 43, which plane areas are of considerably greater width or lateral extent than side areas 40 and 41 and are longitudinally contiguous therewith. As shown in FIG. 2, side areas 40 and 41 are of curved shape in cross section, and constitute symmetrical side portions which connect plane areas 42 and 43 together. Such areas 40 and 41 and the portions of plane areas 42 and 43 contiguous therewith cover the sides or hip regions of the wearer when in use. The girdle or sheath as a whole is contoured in that the top, which embraces the waist of the wearer, is narrower (i.e., has a smaller periphery) than the portion of the girdle below the waist which covers the buttocks of the wearer, the girdle increasing in width or peripheral extent until it reaches a maximum slightly above the bottom or leg opening where maximum freedom is desired. Because of its elasticity, the girdle is stretchable as a whole to enclose and mold the body of the wearer to the slim configuration desired.

Figure 4:
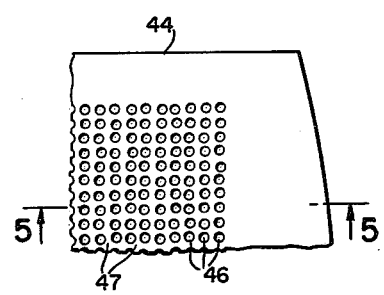
FIGURE 4 is a greatly enlarged view of the small area of the front of the girdle indicated by 4—4 in FIG. 1.
Figure 5:
FIGURE 5 is a cross sectional view of the area of FIG. 4 taken along the lines 5—5.
Figure 3:
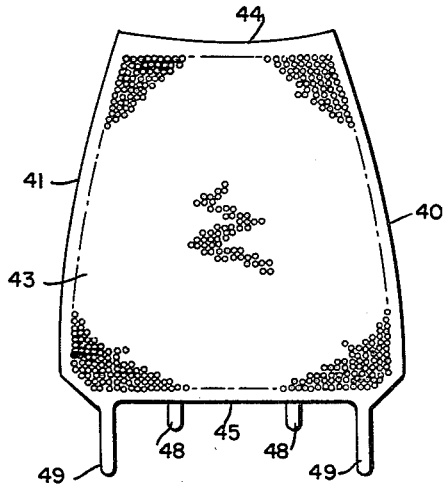
FIGURE 3 is a plan view of the rear of the girdle of FIG. 1 in a similar position.

As shown in FIG. 1 and in accordance with the present invention, substantially all of the plane area constituting the front of the girdle, except for narrow bands or margins 44 and 45 which are laterally disposed at the top and bottom of the girdle, contains a multitude of closely spaced pores, small holes, openings or orifices 46. FIG. 3 illustrates a similar provision of pores in the plane area 43 constituting the back of the girdle. As shown more clearly in the enlarged view of FIG. 4, pores 46 are closely spaced in a substantially regular and uniform pattern and are separated by thin webs or ribs 47. As is apparent from the cross sectional enlarged view of FIG. 5, pores 46 furnish substantially straight channels or passages between the inside surface of the girdle, which is next to the skin of the wearer, and the outside surface of the girdle, which is in communication with the atmosphere except for impervious margins 44 and 45. It has been found that pores 46 furnish very satisfactory ventilation and can be effectively manufactured when they are about 10 to 80, and preferably 20 to 35, thousandths of an inch wide, when in an unstretched state.

An embodiment of a dipping form for preparing a girdle, in accordance with the invention, is indicated generally at 51 in FIGS. 6 through 10, inclusive. Form 51 is provided with hook-like supporting members 52 which project from the top of the form and are used to support the form during the dipping process hereinafter described and to hold the form when the girdle is stripped off the form at the conclusion of the dipping process. The form has bosses on both the front and back of the form, such bosses constituting slightly elevated surfaces 53 and 54, respectively, which project upwardly from main article generating surfaces 55 and 56, which function to generate plane surfaces 42 and 43 of the girdle, and from subsidiary side generating surfaces 57 and 58, which function to generate side areas 40 and 41 of the girdle, surfaces 55, 57, 56 and 58 being integral portions of the same closed or peripherally complete surface for generating a continuous seamless film. These bosses, which define the reinforced edge of lower margin 45 of the front and back of the girdle shown in FIGS. 1 and 3, are provided with substantially perpendicular walls, joining the surfaces 53 and 54 and surfaces 55 and 56, respectively, the function and the action of which, in generating a marginal reinforcement during dipping, is clearly set forth in U.S. Patents 2,015,632 and 2,086,481, issued September 24, 1935 and July 6, 1937, respectively, to A. N. Spanel. The bosses have elongated ribbon-like channels 59 and 61 which constitute integral continuations of the main girdle generating surfaces 55 and 56, respectively, and which serve to form garter tabs 48 and 49 of the girdle, as shown in FIGS. 1 and 3, all as described more fully in U.S. Patent 2,360,736. The lowermost portions of main generating surfaces 55 and 56 terminate in latitudinally arcuate edges 62 and 63 which define the top of the finished girdle and which cooperate with perpendicular inwardly extending walls joining these edges with the bottom of the form 64 so as to form an edge for trimming as described in the above patents.

Figures 10, 11:
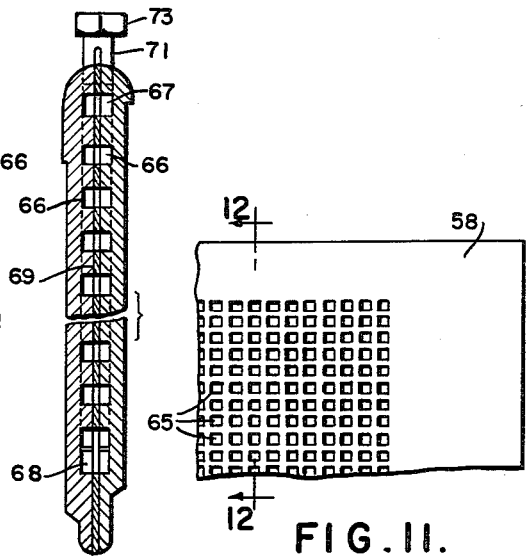
FIGURE 10 is a cross sectional view of the form shown in FIG. 6 taken along the lines 10—10 of FIG. 6.
FIGURE 11 is a greatly enlarged view of a small portion of the flat surface of the form shown in FIG. 6, as indicated by the area 11—11 thereof.
Figure 12:
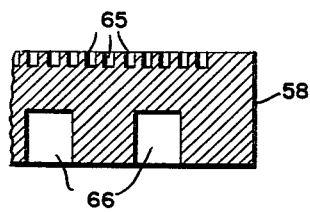
FIGURE 12 is a cross sectional view of the portion of the form shown in FIG. 11 taken along the lines 12—12.

In accordance with the embodiment of the invention shown in FIGS. 6 to 10, inclusive, and as shown more clearly in FIGS. 11 and 12, a multitude of blind pores, cavities, holes or follicles 65 are positioned uniformly over most of the plane surfaces 55 and 56 of form 51, the distribution of cavities 65 being coextensive with the distribution of pores 46 in the girdle shown in FIGS. 1 and 3. These cavities effect an essential step in the formation of the girdle described above by trapping air during the dipping process, which air thereafter is expanded, as by heating, with the result that it breaks, bursts or presses open the wet film of rubber latex which has bridged across the mouth of the cavity during the dipping process, thus forming a pore, hole or opening in the film of latex deposited on the form. Because of the critical function of these cavities, their dimensions are carefully selected and correlated with the dipping conditions, including the rate or speed at which the dipping form is removed from the bath, the concentration of solids in the rubber latex, the viscosity and particularly the surface tension of latex employed, so that a film of latex bridges over each cavity. The cavities should not be so wide that a substantial amount of latex runs into and fills up the hole. On the other hand, if the cavities are too small or shallow, the volume of air trapped is insufficient to exert enough pressure to break the bridging film during the subsequent expansion of the gas in the cavity by internal heating of the form. Diameters (or width where square holes are formed) that are effective are in the range of about 10 to 100 thousandths of an inch, about 15 to 40 thousandths being substantially effective; an effective depth for the smaller cavities is of the order of 20 thousandths of an inch and depends upon the viscosity of the latex while generally the larger holes can be about as deep as they are wide.

The cavities in form 51 can be impressed, embossed or drilled in the surface of the form by methods familiar to those skilled in the art of processing metals. The blind cavities can be round, square, hexagonal or octagonal, and, in general, any polygonal shape (see FIGURES 11 and 12). After blind cavities of the proper depth have been formed in the plate, it is turned over and milled out to form steam or hot water passageways or channels 66, as shown in FIG. 10. Such passageways communicate with an entrance manifold or channel 67 and an exit manifold or channel 68. A second plate for the back of the form is similarly impressed with cavities and milled out to form channels and passageways.

The two plates are then assembled with their channel sides facing each other and separated by a gasket 69, such as a sheet of incompletely cured rubber, which can be cured after assembly, or other appropriate gasket materials. The slabs are thereafter screwed or pinned together in a manner such that the surface of the finished form is continuous, such as by countersinking the screws, welding over the screw holes, and milling or grinding the weld to a smooth surface. The form is thereafter fitted with pipes or tubes 71 and 72 which communicate respectively with the entrance and exit manifolds 67 and 68. Tubes 71 and 72 are fitted with connections (not shown) which can be screwed by nuts 73 and 74 to connections on pipes from hot water and to disposal means therefor, respectively. Passageways 66 and channels 67 and 68 accordingly constitute means for internally heating the form.

Form 51 is employed, in accordance with an aspect of the present invention, in generating or forming the girdle of FIGS. 1, 2 and 3 by immersing the dipping form in a bath of rubber latex, typically a natural latex compounded with vulcanizing agents, with the planes of generating surfaces 55 and 56 perpendicular to the surface of the bath and slowly removing the form, as one example at a constant speed in the range of about 0.1 to 0.5 feet per minute from the bath. This operation forms a thin continuous film over the entire surface of the portion of the form which was immersed in the bath. Essentially all the cavities 65 on both the front and back of the form contain pockets of entrapped air covered by bridging films which are integral portions of the continuous film covering the dipping form. For this operation, rubber latices containing about 55 to 65 percent solids are satisfactory.

It is to be noted that the above described method of forming a film bridging the type of cavity here involved is advantageous in that the surface of the film is perpendicular to the axis of the cavity and the plane of the bridging film is substantially identical with the plane of the mouth of the cavity for both the front and back of the form. As a consequence, the bridging films over all of the cavities are subjected to substantially identical forces or strains and therefore behave in an identical fashion, a factor which is material in achieving uniformity in the finished product. Additionally, the weight of the bridging film acts downwardly so that the force of surface tension, which preserves the bridging film intact until blown, is subjected to a minimum counteracting force. When the bridging films in a latitudinal section are maintained intact until they are all blown or burst simultaneously, a more uniform and stronger product is obtained.

It has been found, in accordance with a particular aspect of the invention, that superior results in respect to the maintenance and establishment of the bridging film and in preventing the latex from running into the cavity are obtained in the dipping operation described above, when the dipping form is made so that the shoulder or edge of the cavity (see 65 in FIG. 11) is sharp rather than rounded (i.e., when the sides of the cavity intersect the main generating surface in a substantially perpendicular relation). It is believed, although this aspect of the invention should not be considered to be limited in scope by any theory, that, when the sides of the cavity are perpendicular to the main generating surface and hence to the film of latex, the force urging the latex inwardly into the cavity is at a minimum.

Conversely, when the cavity is bell shaped with its mouth toward the latex film, the surface of the cavity and the surface of the film meet at an acute angle so that the latex can much more easily creep in and fill the cavity so that there is insufficient air in the ensuing blowing operation.

The form, after removal from the bath of latex, is connected to a source of hot water, steam or other fluid heat transfer media through tube 71 and to a means of disposal of such heat transfer media through tube 72 as quickly as possible. The passage of such heat transfer medium quickly heats the form uniformly in the portions or areas of the form in which there are cavities and hence evenly and quickly heats the walls of such cavities, due to the proximity of the heating channels to the surface of the form and the even distribution of such channels in respect thereto. The walls of the cavities transfer heat to the gas trapped therein so that the gas expands and breaks or bursts the still plastic, flowable or moldable bridging film. The material in the broken film thereafter adjusts itself according to the forces of surface tension both around the hole or pore so formed and in the area surrounding the pore, thereby building up the web-like ribs between the pores at a faster rate than by the normal dipping process.

It has been found that the force of surface tension so controls and molds the shape of the opening in the film of latex that a round hole is often formed even when square mouthed cavities are used, particularly if the film is built up to a thickness of about 20 thousandths of an inch or more. Because the periphery of the pore formed by the above process is smooth and continuous, it resists tearing to a much greater extent than does a cut or perforated hole whose periphery necessarily contains minute nicks or cuts in arising from the inevitable irregularity of a perforating device. Because of the tear resistance of the holes formed in this fashion, the girdle of the present invention can advantageously be made with ribs 47 which are not more than about 100 thousandths of an inch wide, thus permitting close spacing of pores 46 and hence excellent ventilation.

After the deposited latex film has dried or solidified to a point where subsequent dipping will not disturb the film, the form is cooled, such as by passing a liquid cooling agent through channels 66 or by allowing the form to cool in a water bath or in the atmosphere, and is subsequently dipped and heated alternately until the desired film thickness, such as a film thickness in the porous area of about 15 to 80 thousandths and preferably about 25 to 50 thousandths of an inch, is built up on the form. The deposited latex film can then be removed from the form, cured and trimmed to yield a girdle or can be processed by any method for producing marketable dipped latex articles. In any event, the film should be treated while still on the form, as by drying and/or partial or complete curing, so that the film can be removed from the form in an unruptured condition. It will be noted that, because of its method of formation, the pores or holes in the finished girdle are much more tear-resistant than if such holes were formed by perforating or cutting a cured continuous film or sheet of rubber, for the reasons noted above. Additionally it has been observed that a porous film formed by the process of the present invention resists further tearing even after the web between the holes is torn, a characteristic which is in sharp contrast to an ordinary film of latex which tends to tear or rip without restraint once a tear is started.

Figure 6:
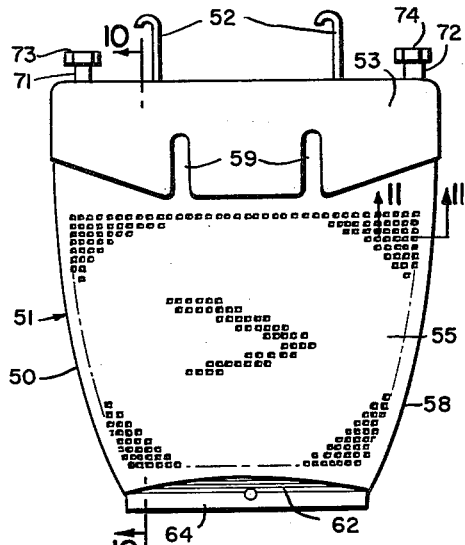
FIGURES 6, 7 and 8 are front, side and back views of a suitable dipping form for making the girdle shown in FIGS. 1, 2 and 3.
Figure 7:
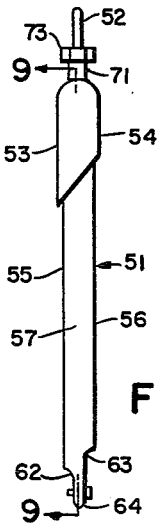
Figure 8:
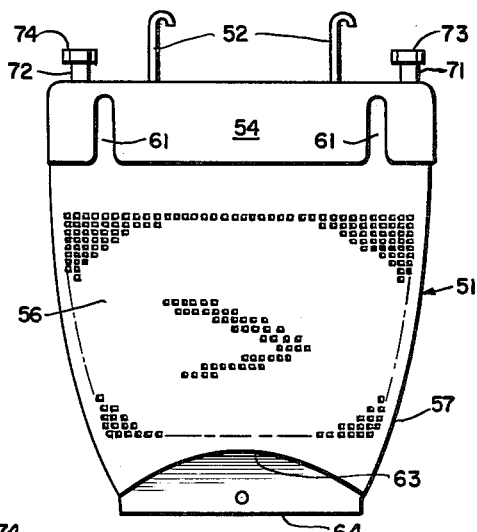
Figure 9:
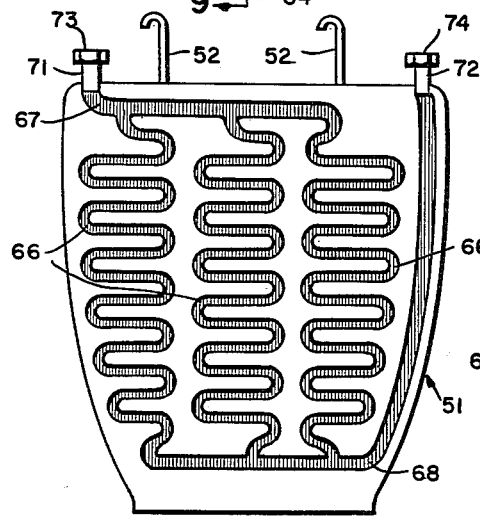
FIGURE 9 is a cross sectional view of the form of FIG. 6 taken along the lines 9—9 of FIG. 7.
Figures 13, 14, 15:
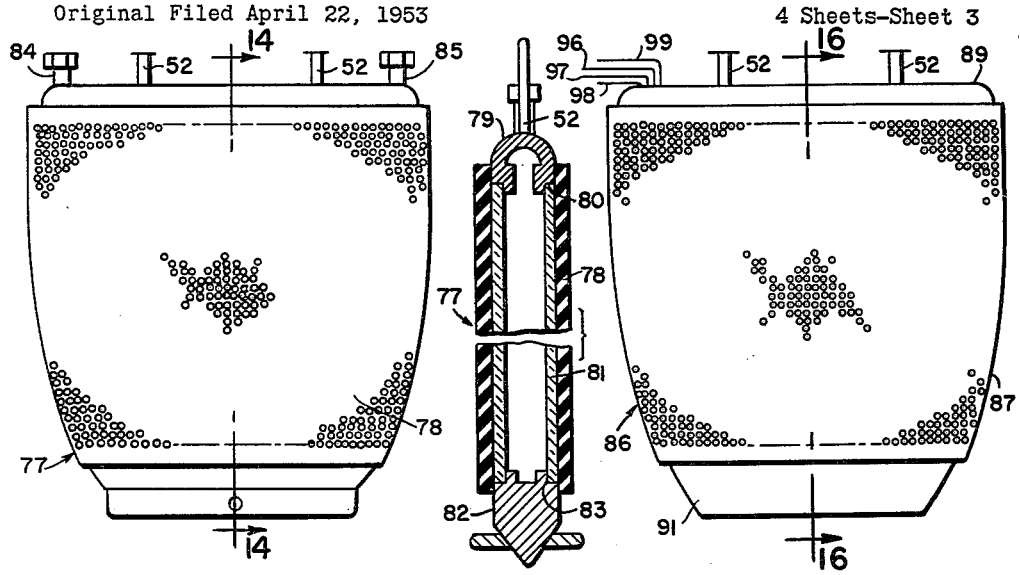
FIGURE 13 is a front elevation of a dipping form that can be used for producing a modified form of the girdle shown in FIG. 1.
FIGURE 14 is a cross sectional view of the form shown in FIG. 13 taken along the lines 14—14.
FIG. 15 is another embodiment of the type of form shown in FIG. 13.

Shown in FIG. 13 is an embodiment of a dipping form which can be used for producing a girdle in which the pores extend over substantially all of the body of the girdle, including the sides thereof, except for a narrow band at the top and the bottom of the girdle. The form shown in FIG. 13, which is indicated generally by 77, will produce a girdle without garter tabs, which accessories can be produced by modifying form 77 as shown in FIGS. 6, 7 and 8. Affixed to the top of form 77 are hook-like members 52, the tops of which are not shown to conserve space in the drawing, which serve the same purpose as similarly numbered members in FIG. 6. Stretched over the surface of form 77 is a sleeve 78 which has holes or pores extending completely therethrough, as shown in FIG. 14, the perforation and function of sleeve 78 being described below.

The top of the form consists of a hollow, preferably metallic, member 79 which can be cast, milled or otherwise formed so as to have a smooth outside surface and a perpendicular ledge or inset member 80 which is coextensive with its lower periphery. Affixed to the outward face of ledge 80, as by cementing with a porcelain cement, and flush with the outer surface of the top 79 is an oval envelope or band 81 of minutely porous material such as unglazed porcelain, sintered fritted glass or adherent but incompletely compacted powdered metal, such as powdered aluminum or iron, formed in the shape shown in FIG. 14. Porous band 81 is affixed to bottom member 82 of the form, which member can be fabricated by casting, milling or otherwise shaping an appropriate metal, at inset member or ledge 83 thereof. Attached to the top 79 of the form are inlet and outlet fluid conduits 84 and 85, to the upper ends of which are attached connections for joining the conduits to a suitable source of and means for disposal of a gas whose character and use is hereinafter described.

When a gas, such as air, nitrogen and the like, under pressure is introduced into the interior of the form, it passes through porous band 81. By masking the surface of porous band 81 with the sleeve 78, the gas emerging from the interior of the form is guided or channeled into a multitude of small passageways constituted by the openings of sleeve 78 so that the gas can form a like multitude of pores or openings in a film of deposited latex resulting from dipping form 77 in a bath of such latex. The above construction furnishes a contoured form wherein the porous portion is peripherally complete as will be the girdle made thereon. When hot gases, such as hot air, are used, the additional advantage is gained that the hot gas both blows the hole and heats the film in direct heat transfer relationship, thus quickly drying the film, such as preliminary to a subsequent dip.

Figures 16, 17, 18:
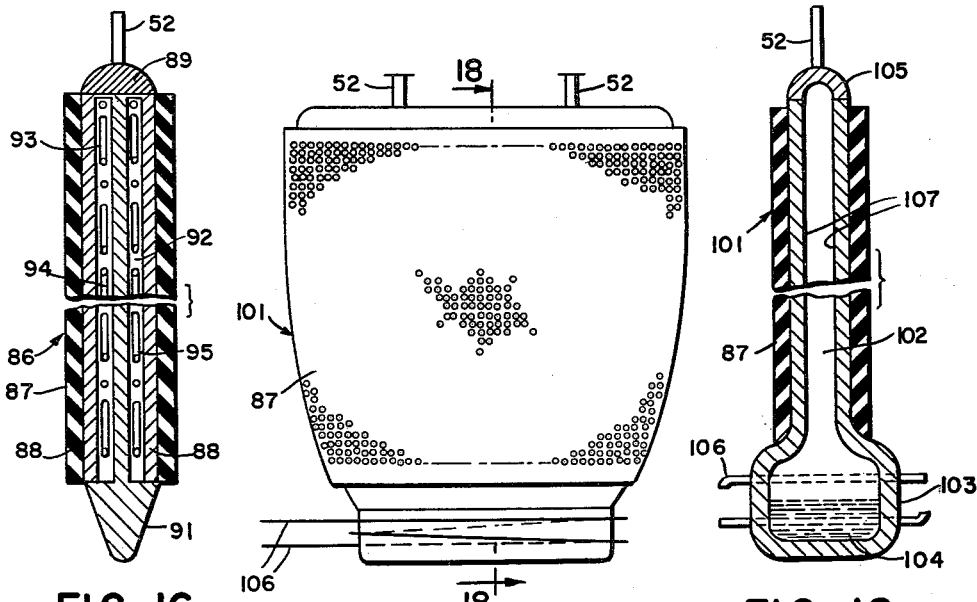
FIGURE 16 is a vertical cross sectional view of the form shown in FIG. 15 taken along the lines 16—16.
FIGURE 17 is the front elevation of another embodiment of the form shown in FIG. 15.
FIGURE 18 is a cross sectional view of the form shown in FIG. 17 along the line 18—18.

Shown in FIG. 15 is an alternative dipping form indicated generally at 86 which can be used to produce a girdle similar to that produced on the form of FIG. 13. Stretching over form 86 is a sleeve 87 similar to that shown in FIG. 13 except that sleeve 87 has blind cavities, holes or follicles uniformly distributed over the surface of the sleeve that is on the outside of the dipping form. The surface of form 86 is formed by a smooth metal sheet 88 extending completely around the form and affixed, as by welding with subsequent grinding, to top member 89 and bottom member 91 which are shaped as shown, the former having hook-like members 52, the tops of which have been omitted to conserve space on the drawing. Positioned within form 86 adjacent the inner surface of metal sheet 88 and embedded in an insulating material 92, such as cement or alundum, are two sets of three heating coils 93, 94 and 95, which are positioned or arranged regularly and uniformly adjacent the inner surface of metal sheet 88, as indicated in FIG. 16. These sets of heating coils are connected in parallel with individual leads 96, 97 and 98 to each pair of coils, all of the coils having a common return or bus bar 99. Such individual leads are useful in heating only a section of the dipping form as it emerges from the dipping bath, thus affording extremely good control over the blowing or pore forming operation.

An advantageous method of affixing a sleeve having pores or holes open at both ends to a form is that of placing a layer of plaster or the like, which expands when it sets, between the sleeve and the form, the sleeve preferably being backed with a thin, impenetrable membrane, such a sheet of polyethylene or the like. By such a technique, the sleeve is bonded to the form in a manner that prevents seepage of the latex between the sleeve and the form and also seals the bottom of the pores. Sealing the bottom of each pore is important because gaseous communication between pores during the blowing process results in malfunction unless the communicating pores blow simultaneously. Alternatively the sleeve can be sealed by placing a bladder between it and the form and inflating the bladder.

Shown in FIGS. 17 and 18 is an embodiment of a dipping form indicated generally at 101, which has hook-like members 52, the tops of which have been omitted to conserve space in the drawing. Form 101, which has a smooth surface, is equipped with a sleeve 87, formed in a similar fashion to the like numbered sleeve described in connection with FIGS. 15 and 16. Form 101 is formed so that it has a sealed hollow interior chamber 102 at the bottom of which is an enlarged portion or boiler 103 for containing a volatile liquid 104, such as water, carbon tetrachloride and chlorinated or fluorinated hydrocarbons and other relatively non-flammable liquids having boiling points, at from about 0.5 to 2 atmospheres, of from about 150° to 250° F. Form 101 can be made in two parts consisting of the majority of the form and a top member 105, the liquid placed in the boiler, and then the form sealed, as by welding. In use, the form is dipped into a bath of latex, removed and an induction coil 106 placed around boiler 103 in order to heat the metal thereof. When the temperature of the metal reaches the boiling point of the liquid, it boils up and condenses on the inner surface 107 of the form, thereby heating the form and the walls of the cavities in sleeve 87 so that the air entrapped in the cavities expands and causes the formation of pores in the film of latex. It will be understood by those skilled in the art that the surface of the form itself may be impressed with cavities, for example, in the manner described in connection with FIGS. 6 through 12, inclusive, instead of using sleeve 87.

Figure 19:
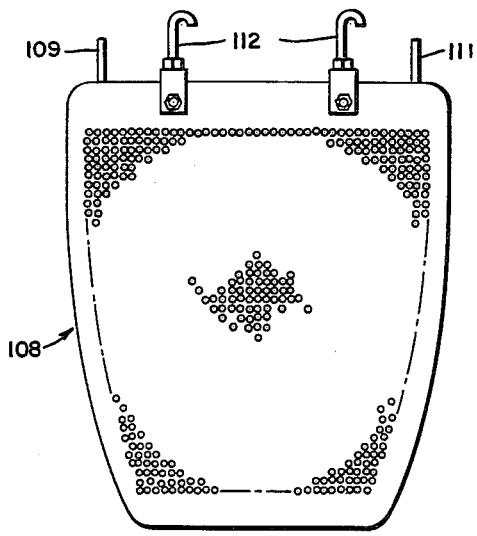
FIGURE 19 is the front elevation of still another embodiment of a form useful in making a girdle in accordance with the present invention.

FIG. 19 is an embodiment of a form useful in making a girdle in which the dipping form, indicated generally at 108, is made from two cast and subsequently ground, or otherwise formed, solid slabs, plates or sheets of glass, between which is cemented a thin layer or sheet of electrically conductive glass or rubber or two flat sheet-like metal electrodes between which is a sheet of material known to heat when these electrodes are employed as the plates of a condenser (i.e., dielectric heating is effected). Electric leads 109 and 111 serve to pass current between outermost boundaries of the electrically conductive layer. Form 108 is drilled near its upper edge so that the U-shaped lowermost portions of hook-like supporting members 112 can be bolted thereto, members 112 serving the same purposes as hook-like members 52 previously described. Blind cavities are created by cavitation in the surface of form 108, which desirably is ground to a flat surface within about a thousandth of an inch, either before or after assembly with the electrically conducing layer.

Form 108 may be used without any electrically conductive layer by dipping the form into a bath of latex and forming a continuous film of latex thereon, and quickly transferring the film-covered form to a chamber in which the circumambient atmosphere is at a substantially different pressure than the pressure of the air entrapped in the cavities of the form so that the bridging films are ruptured. Thus the form can be placed in a chamber in which a vacuum of between one to five pounds per square inch absolute is very rapidly generated or the form can be placed in a pressure chamber and a pressure of from two to ten atmospheres quickly built up. In either event, the difference in pressure causes the gas entrapped in the cavities to change its volume and rupture the bridging film either by inward or outward movement.

Figure 20:
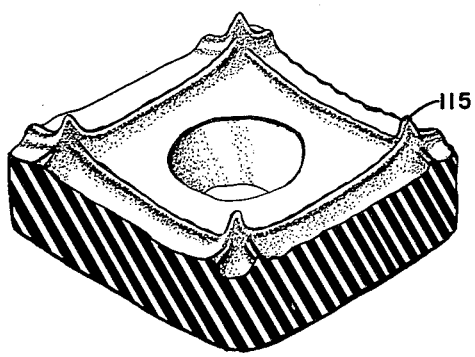
FIGURE 20 is a greatly enlarged view, on the body side of a single bore in a particular embodiment of the girdle of the present invention.
Figure 21:
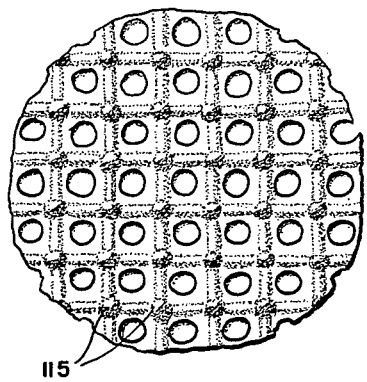
FIGURE 21 is a photomicrograph of a plurality of pores similar to the one shown in FIG. 20.

It has been discovered, in accordance with a particular aspect of the present invention, that the use of a polygonal cavity or pore which has angular corners, such as the square cavities shown in FIG. 11, results in the highly desirable generation of a nap-like surface on the surface of the girdle which is contiguous to the dipping form during the dipping process. Such a nap-like or felt-like surface, which has the warm friendly feel of fabric rather than the less friendly feel of a smooth rubber film, results from a minor intrusion or running down of the liquid latex into the sharp corners of the pores to form fingers, streamers or tendrils 115 as shown in the extremely greatly enlarged single hole shown in FIG. 20. FIG. 21, which is a microphotograph of such a surface when enlarged ten times, shows the regularity with which such streamers are formed around each hole and the extremely close juxtaposition of such streamers to form a very uniform surface. Streamers 115 are apparently attached strongly enough to the body of the girdle as to be pulled out of the holes with considerable regularity, thus leaving the surface of the form substantially in the same condition as it was prior to the dip. Streamers 115 vary in length and are typically from about 10 to 30 and averagely 20 thousandths of an inch in length when generated on a form having square holes 25 thousandths of an inch wide.

As is apparent from the foregoing description, the present invention provides an effective solution to the long unsolved problem of providing adequate ventilation in a rubber latex girdle under conditions that lead to heavy perspiration. The girdle of the present invention is particularly effective in that it affords the greatest ventilation in the areas of greatest stretch where the material of the girdle is in closest proximity to the skin. Additionally, the present invention provides efficient and economical methods for fabricating such a girdle.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

1. A method of preparing an article comprising a seamless multiperforate contoured rubber sheath, including the steps of dipping in a bath of rubber latex of dippable viscosity a contoured heat-conductive dipping form having a continuous film generating surface, a substantial portion of the surface of said form having a multitude of pores therein bridgeable by said rubber latex when deposited thereon, removing said form from said bath covered with a deposited continuous film of said latex and with minor intrusion of latex onto the walls of said pores, said continuous film closing the pores in said form and entrapping the gas contained therein, creating a pressure differential across the wet latex film sufficient to puncture the bridged portions of the film overlying the pores in said form thereby forming in said latex film a multitude of perforations having sides and shoulders shaped by the surface tension of the latex, drying said film, repeating the dipping, film-forming and puncturing operations until the desired thickness of seamless multiperforate sheath of rubber is formed, and thereafter removing said film from said form said film being characterized by latex projections around said perforations formed by the latex intrusion into the pores of said form.

2. A method according to claim 1 in which the pores in said dipping form are closed bottom cavities, said cavities being filled with gas entrapped in said pores by formation of the continuous wet latex film during the dipping operation, and the gas in said cavities is heated to create said pressure differential thereby perforating the latex film.

References Cited in the file of this patent
UNITED STATES PATENTS

| | | |
|---|---|---|
| 1,923,524 | Young et al. | Aug. 22, 1933 |
| 2,032,923 | Eldridge | Mar. 3, 1936 |
| 2,032,942 | Linscott et al. | Mar. 3, 1936 |
| 2,106,808 | Murphy et al. | Feb. 1, 1938 |
| 2,234,842 | Jordan | Mar. 11, 1941 |
| 2,268,678 | Tingy | Jan. 6, 1942 |
| 2,801,445 | Gienger et al. | Aug. 6, 1957 |
| 2,867,847 | Miller et al. | Jan. 13, 1959 |